R. E. FERRIS.
CONTROL SYSTEM.
APPLICATION FILED OCT. 14, 1916.

1,317,283.

Patented Sept. 30, 1919.

WITNESSES:

INVENTOR
Ralph E. Ferris.
BY
ATTORNEY

UNITED STATES PATENT OFFICE.

RALPH E. FERRIS, OF SWISSVALE, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,317,283.      Specification of Letters Patent.     Patented Sept. 30, 1919.

Application filed October 14, 1916. Serial No. 125,589.

*To all whom it may concern:*

Be it known that I, RALPH E. FERRIS, a citizen of the United States, and a resident of Swissvale, in the county of Allegheny and State of Pennsylvania, have invented a new and useful Improvement in Control Systems, of which the following is a specification.

My invention relates to control systems for governing the operation of electric motors and particularly to regenerative systems employing a third-rail conductor for supplying energy to the main driving motors.

The object of my invention is to prevent local currents of dangerous value from flowing through a circuit including the main driving motors and an auxiliary exciter motor when the current-collecting shoe is disengaged from the supply-circuit conductor.

My invention provides a switch that is actuated by a contact shoe when the same becomes disconnected from the supply-circuit conductor.

Figure 2:
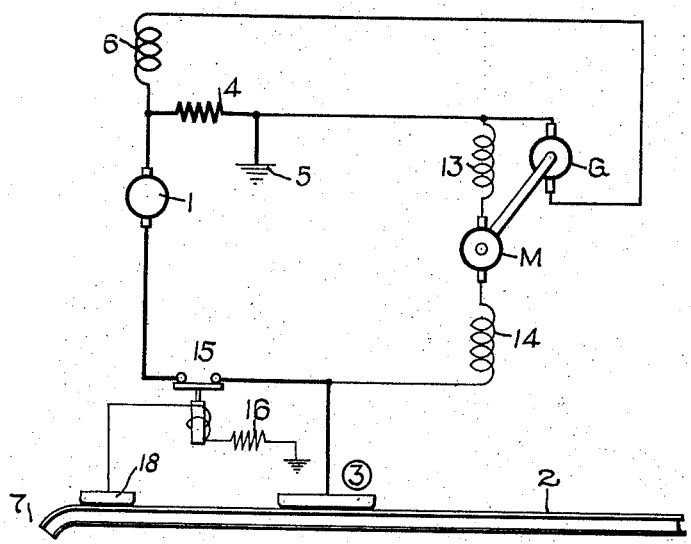
Figure 1:
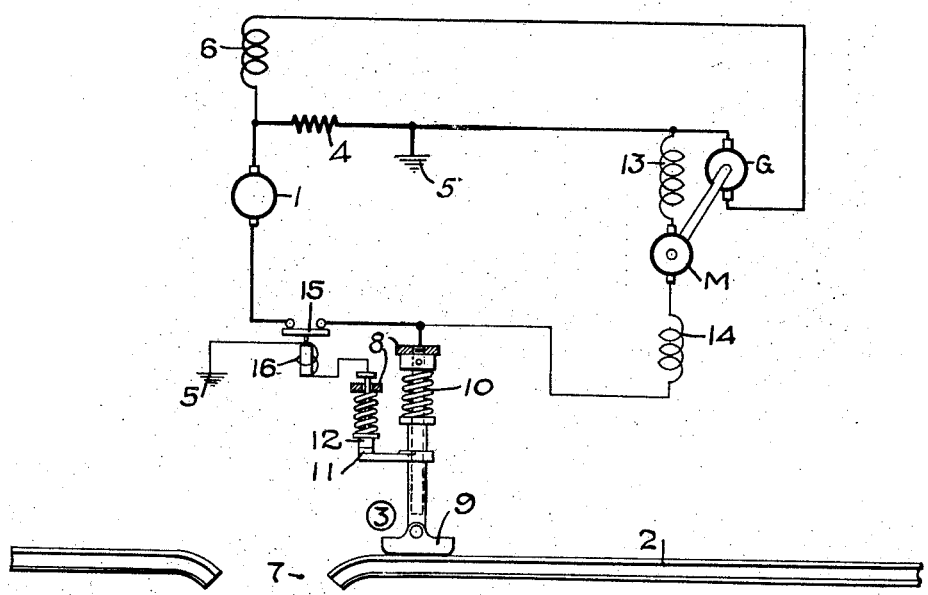

Figure 1 of the accompanying drawing is a diagrammatic view of a control system embodying my invention, and Fig. 2 is a modification of the system shown in Fig. 1.

Referring to Fig. 1 of the drawing, a main driving motor 1 is supplied with energy from a third-rail conductor 2 through a current-collecting member 3 and a resistor 4 to a ground return-circuit conductor 5. The field winding 6 of the motor 1 is energized by a generator G which is driven by an auxiliary-motor M. The generator G and the motor M are respectively provided with field windings 13 and 14. The third-rail conductor 2 is composed of a number of sections having intermediate gaps 7, at which points the current-collecting member 3 disengages the rail 2 in passing from one section to another. The current-collecting member 3 comprises a supporting frame 8, which is secured to the locomotive structure, and a movable contacting shoe 9, the lower part of which is pivotally connected to a main sleeve member and the entire structure of which is held in yielding engagement with the rail 2 by a spring 10. The shoe 9 is provided with an auxiliary contact member 11 which engages a yieldingly-mounted contact member 12 to establish a circuit from the current-collecting member 3, through the energizing coil of a line switch 15 and a resistor 16 to the return-circuit conductor 5. The closure of the line switch 15 establishes a loop-circuit through the main motor 1 and the auxiliary motor M. The yieldingly-mounted contact member 12 permits of a slight movement of the shoe 9 without interrupting the energizing circuit of the switch 15. The shoe 9 will, however, be depressed to more than a normal degree when passing from one section of the conductor 2 to a following section and, when this occurs, the contact member 11 will disengage the contact member 12 and thereby interrupt the circuit of the main driving motor 1.

Fig. 2 shows a slight modification of the system disclosed in Fig. 1, in which an auxiliary shoe 18 is employed to energize the switch 15 that completes a circuit for the main motor 1. In passing from one section of a third-rail conductor to a succeeding section, the auxiliary shoe 18 will become disengaged from the third-rail conductor 2 and deënergize the coil of the switch 15 and thereby interrupt the circuit for the main motor 1.

If the shoe 3 becomes disengaged from the conductor 2 during regeneration in a control system not employing means for interrupting the circuit of the driving and auxiliary motors, the voltage generated by the machine 1 will increase and the potential drop across the resistor 4 will decrease by reason of the interrupted flow of load current. The increased voltage impressed upon the motor M will cause a corresponding increase in the speed and voltage of the generator G. The increased generator voltage further increases the excitation of the field 6, thus making the action cumulative and resulting in a flash-over of the motor 1 or M. Such a flash-over is prevented by opening the main motor circuit as herein set forth.

It may readily be seen that such a device as I have disclosed is capable of various modifications and I desire, therefore, that only such limitations should be imposed as are indicated in the appended claims.

I claim as my invention:

1. In a vehicle-control system, the combination with a main driving motor, and auxiliary means for energizing the field winding of said motor, of a third rail adapted to supply energy to said motor, said rail comprising a plurality of sections having gaps therebetween, a contact shoe held in yielding engagement with said rail and adapted to have considerable movement when passing over one of said gaps and a switch adapted to be actuated by the movement of said shoe for interrupting the circuit of said motor.

2. In a vehicle-control system, the combination with a main driving motor, and an auxiliary motor-generator set for energizing the field winding of said motor, of a third-rail conductor comprising a plurality of sections having gaps therebetween, the ends of said sections being bent laterally at said gaps, a contact shoe slidably engaging said conductor and adapted to move outwardly at the ends of said sections, and means secured to said contact shoe for interrupting the motor circuit when said shoe passes over one of said gaps.

3. In a vehicle-control system, the combination with a driving motor, and means for separately exciting the field winding of said motor, of a third rail for supplying energy to said motor comprising a plurality of sections having gaps therebetween, a shoe having sliding engagement with said rail, and means for interrupting the circuit of said motor when said shoe passes over one of said gaps.

4. In a vehicle-control system, the combination with a main driving motor, and auxiliary means for energizing the field winding of said motor, a contact shoe adapted to be held in yielding engagement with a supply-circuit conductor, and a switch adapted to be actuated by an abnormal movement of said shoe for interrupting the circuit of said motor.

5. In a vehicle-control system including a main control circuit, the combination with a third rail, of a shoe biased to slidable engagement with said rail and connected to control the transmission of energy to said system, and means for interrupting said main control circuit when said shoe disengages said rail.

6. In a vehicle-control system including a main control circuit, the combination of a third rail comprising a number of sections having gaps therebetween, current-collecting means, and means for interrupting said main control circuit when said current-collecting means passes said gaps.

7. In a vehicle-control system, the combination with a supply-circuit conductor, and a contact shoe adapted to be held in yielding engagement with the supply-circuit conductor, of a switch adapted to be actuated by an abnormal movement of said contact shoe for governing the operation of the system.

8. In a vehicle-control system having a third rail, a third-rail shoe adapted to have restricted movement when engaging said rail, and a switch adapted to be actuated when the movement of said shoe exceeds a predetermined small degree for controlling the operation of the system.

9. In a system of control for an electric vehicle, a third-rail contact shoe and a switch adapted to be actuated by said shoe for governing the operation of the system.

In testimony whereof, I have hereunto subscribed my name this 10th day of Oct., 1916.

RALPH E. FERRIS.

Copies of this patent may be obtained for five cents each, by addressing the "Commissioner of Patents, Washington, D. C."